US008896278B2

(12) United States Patent
Ouyang et al.

(10) Patent No.: US 8,896,278 B2
(45) Date of Patent: Nov. 25, 2014

(54) MULTI-PHASE SWITCHING CONVERTER WITH OVERLAP MODE AND CONTROL METHOD THEREOF

(71) Applicant: Chengdu Monolithic Power Systems Co., Ltd., Chengdu (CN)

(72) Inventors: Qian Ouyang, Hangzhou (CN); Lijie Jiang, Hangzhou (CN); Xiaokang Wu, Hangzhou (CN); Bo Zhang, Hangzhou (CN); Suhua Luo, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 50 days.

(21) Appl. No.: 13/720,710

(22) Filed: Dec. 19, 2012

(65) Prior Publication Data
US 2013/0307503 A1    Nov. 21, 2013

(30) Foreign Application Priority Data
May 18, 2012   (CN) .......................... 2012 1 0154898

(51) Int. Cl.
*G05F 1/577* (2006.01)
*G05F 1/10* (2006.01)

(52) U.S. Cl.
CPC ...................................... *G05F 1/10* (2013.01)
USPC ...................................................... 323/267

(58) Field of Classification Search
USPC ......... 323/265, 268, 269, 271, 272, 282, 283, 323/351
See application file for complete search history.

(56) References Cited

U.S. PATENT DOCUMENTS

| | | | | |
|---|---|---|---|---|
| 5,905,369 A * | 5/1999 | Ishii et al. | ...................... | 323/272 |
| 6,362,608 B1 * | 3/2002 | Ashburn et al. | ............... | 323/272 |
| 6,654,264 B2 * | 11/2003 | Rose | ............................... | 363/65 |
| 6,674,274 B2 * | 1/2004 | Hobrecht et al. | ............. | 323/285 |
| 6,836,417 B2 * | 12/2004 | Hiraki et al. | .................. | 323/268 |
| 6,903,537 B2 * | 6/2005 | Tzeng et al. | .................. | 323/268 |
| 7,005,835 B2 * | 2/2006 | Brooks et al. | ................. | 323/282 |
| 7,109,691 B2 * | 9/2006 | Brooks et al. | ................. | 323/282 |
| 7,199,561 B2 * | 4/2007 | Noma | ........................... | 323/224 |
| 7,215,102 B2 * | 5/2007 | Harris et al. | .................. | 323/268 |
| 7,301,313 B1 * | 11/2007 | Hart et al. | ..................... | 323/269 |
| RE41,270 E * | 4/2010 | Hiraki et al. | .................. | 323/268 |
| 7,795,915 B2 * | 9/2010 | Candage et al. | ................ | 326/59 |
| 8,022,726 B2 * | 9/2011 | Candage et al. | ................ | 326/59 |
| 8,575,902 B1 * | 11/2013 | Wei et al. | ...................... | 323/269 |
| 8,624,567 B2 * | 1/2014 | Popescu | ........................ | 323/267 |
| 2011/0025284 A1 | 2/2011 | Xu | | |
| 2011/0188218 A1 | 8/2011 | Hsing et al. | | |
| 2012/0274293 A1 | 11/2012 | Ren et al. | | |

* cited by examiner

*Primary Examiner* — Adolf Berhane
(74) *Attorney, Agent, or Firm* — Perkins Coie, LLP (57) ABSTRACT

A multi-phase switching converter and control method thereof. The multi-phase switching converter includes a plurality of switching circuits and a controller. The output terminals of the plurality of switching circuits are coupled together to provide an output voltage to a load. The controller is configured to generate a plurality of control signals to turn on the plurality of switching circuits successively. When a load current increase is detected, the controller operates in an overlap mode and at least two switching circuits subsequent to the current switching circuit are turned on simultaneously. After the overlap mode, the controller resumes to the interleave mode and turns on the plurality of switching circuits successively from the switching circuit subsequent to the at least two switching circuits.

11 Claims, 10 Drawing Sheets

MULTI-PHASE SWITCHING CONVERTER WITH OVERLAP MODE AND CONTROL METHOD THEREOF

CROSS-REFERENCE TO RELATED APPLICATION(S)

This application claims the benefit of CN application 201210154898.9, filed on May 18, 2012, and incorporated herein by reference.

TECHNICAL FIELD

The present invention generally relates to electronic circuits, and more particularly but not exclusively to multi-phase switching converters and control methods thereof.

BACKGROUND

In power solutions of high performance CPU, switching converters with lower output voltage and higher output current are required. Multi-phase switching converters are widely used in these applications because of its good performance.

Figure 1:
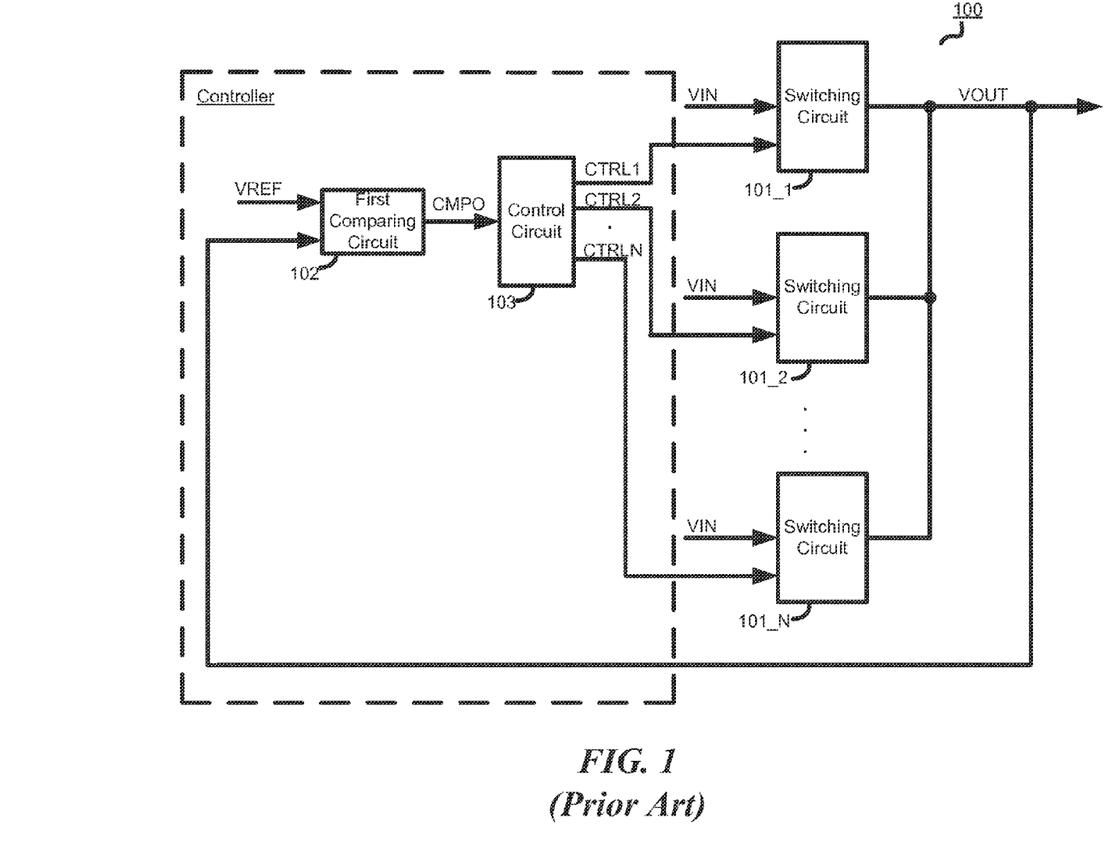
FIG. 1 is a block diagram of a prior multi-phase switching converter 100.

FIG. 1 is a block diagram of a prior multi-phase switching converter 100. The multi-phase switching converter 100 comprises N switching circuits 101_1~101_N, wherein N is an integer larger than or equal to 2. The input terminals of the N switching circuits are configured to receive an input voltage VIN, the output terminals of the N switching circuits are coupled together to provide an output voltage VOUT to a load. The controller comprises a first comparing circuit 102 and a control circuit 103. The first comparing circuit 102 compares the output voltage VOUT with a reference signal VREF to generate a comparison signal CMPO. The control circuit 103 generates control signals CTRL1~CTRLN based on the comparison signal CMPO to control the ON and OFF switching of the N switching circuits. Generally, when the comparison signal CMPO is logical high which indicates the output voltage VOUT is smaller than the reference signal VREF, the control circuit turns on the corresponding switching circuit to provide energy to the load. The switching circuit is turned off by the control circuit when its on-time reaches a predetermined time threshold.

In normal operation, the multi-phase switching converter 100 operates in an interleave mode and the switching circuits 101_1~101_N are turned on successively. When a load current increase is detected, the multi-phase switching converter 100 enters into an overlap mode. The switching circuits 101_1~101_N are turned on simultaneously to provide more current to the load. After the overlap mode, the interleave mode is resumed and the switching circuits 101_1~101_N are turned on successively from the first switching circuit.

Figure 2:
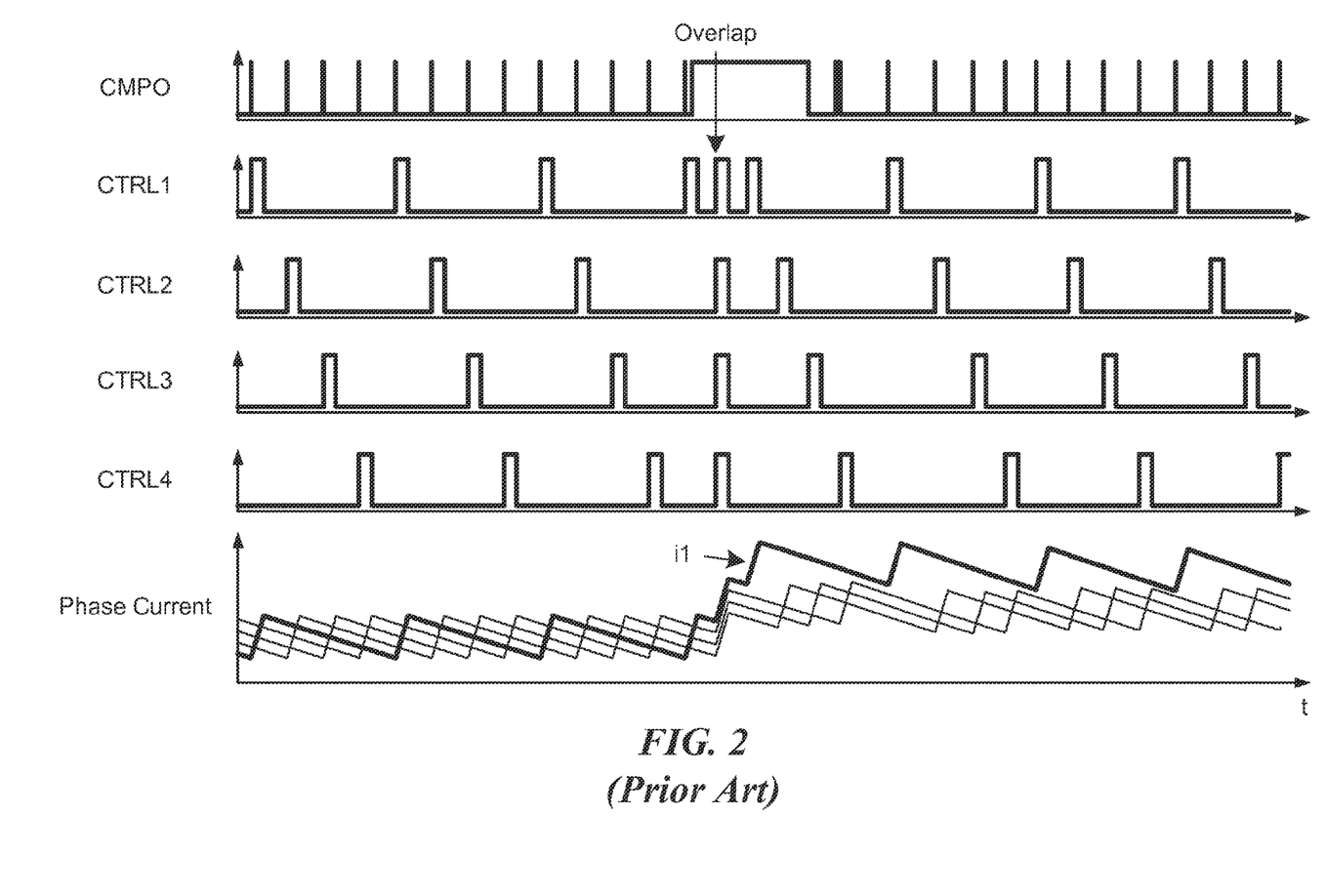
FIG. 2 is a working waveform of a prior 4-phase switching converter.

FIG. 2 is a working waveform of a prior 4-phase switching converter. When a load current increase is detected, the 4-phase switching converter enters into the overlap mode and all the switching circuits are turned on simultaneously. As shown in the figure, the phase current (output current) i1 of the first switching circuit is the highest before the overlap happens. Since the first switching circuit is turned on again after the overlap mode, the phase current i1 keeps increasing and the phase current will be imbalanced among the switching circuits.

SUMMARY

Embodiments of the present invention are directed to a multi-phase switching converter comprising a plurality of switching circuits and a controller. The output terminals of the plurality of switching circuits are coupled together to provide an output voltage to a load. The controller is configured to generate a plurality of control signals to turn on the plurality of switching circuits successively. When a load current increase is detected, the controller operates in an overlap mode and after a current switching circuit of the plurality of switching circuits turns on, at least two switching circuits are turned on simultaneously. After the controller exits out of the overlap mode, the controller resumes to successively turning on the plurality of switching circuits.

BRIEF DESCRIPTION OF THE DRAWINGS

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Embodiments of the present invention are directed to a multi-phase switching converter which operates in an overlap mode when a load current increase is detected. During the overlap mode, at least two switching circuits subsequent to the current switching circuit are turned on simultaneously. After the overlap mode, the multi-phase switching converter resumes to an interleave mode and turns on the plurality of switching circuits successively from the switching circuit subsequent to the at least two switching circuits. In this specification, multi-phase switching converters with constant on-time control are set as examples to describe the embodiments. However, persons skilled in the art will recognize that the present invention can also be used in multi-phase switching converters with any other control method.

Figure 3:
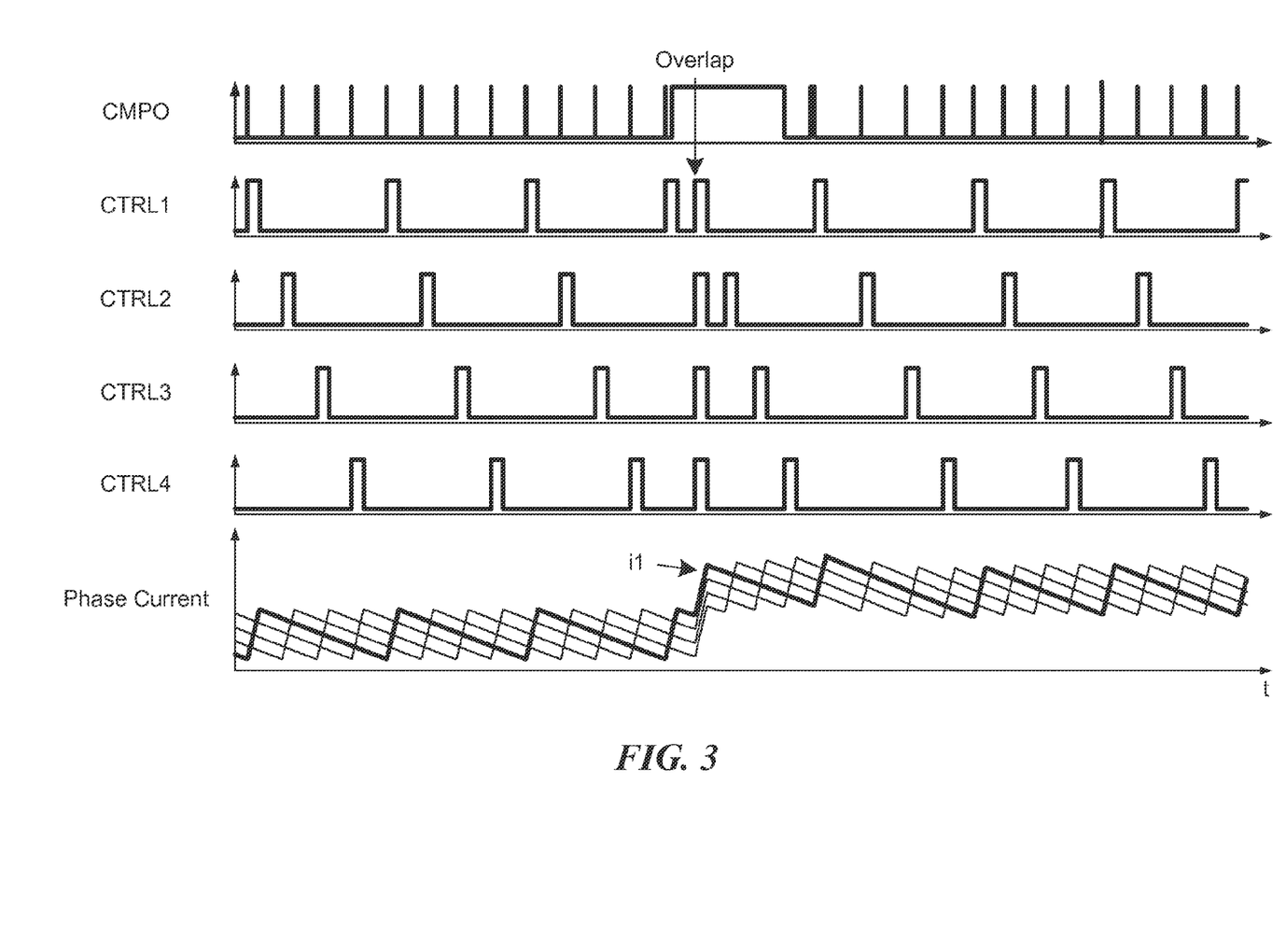
FIG. 3 is a working waveform of a 4-phase switching converter in accordance with one embodiment of the present invention.

FIG. 3 is a working waveform of a 4-phase switching converter in accordance with one embodiment of the present invention. When a load current increase is detected, the 4-phase switching converter enters into the overlap mode and the 4 switching circuits are turned on simultaneously. As shown in the figure, the phase current i1 of the first switching circuit is the highest before the overlap happens. After the overlap mode is finished, the 4-phase switching converter turns on the switching circuits successively from the second switching circuit. Since the second switching circuit is turned on instead of the first switching circuit after the overlap mode, the phase current i1 will not keep increasing and the phase current balance of the 4-phase switching converter is maintained.

Similarly, for a N-phase switching converter, when a load current increase is detected, the N-phase switching converter will enter into the overlap mode and all the switching circuits are turned on simultaneously. If the phase current of the $m^{th}$ switching circuit is the highest before the overlap mode, the N-phase switching converter will turn on N switching circuits successively from the switching converter after the $m^{th}$ switching circuit (such as the $(m+1)^{th}$ switching circuit), wherein m=1, 2, . . . , N. As a result, the phase current of the $m^{th}$ switching circuit will not keep increasing to induce the phase current imbalance among the N switching circuits.

In one embodiment, the load current increase is detected based on the status of the comparison signal CMPO during the minimum off-time of the current switching circuit. For example, a load current increase will be detected if the comparison signal CMPO is logical high (which indicates the output voltage VOUT is smaller than the reference signal VREF) in the minimum off-time of the current switching circuit. The multi-phase switching converter will enter into the overlap mode and all the switching circuits will be turned on simultaneously.

In some embodiments, the multi-phase switching converter does not turn on all the switching circuits simultaneously in the overlap mode. Instead, it determines the number of the switching circuits that have been simultaneously turned on based on the load condition. In one embodiment, the multi-phase converter compares the output voltage VOUT with a plurality of threshold voltages to generate a plurality of load indication signals. Based on the plurality of load indications signals, the multi-phase converter detects whether the load current is increased and determines the number of the switching circuits that have been simultaneously turned on during the overlap mode when a load current increase is detected.

Figure 4:
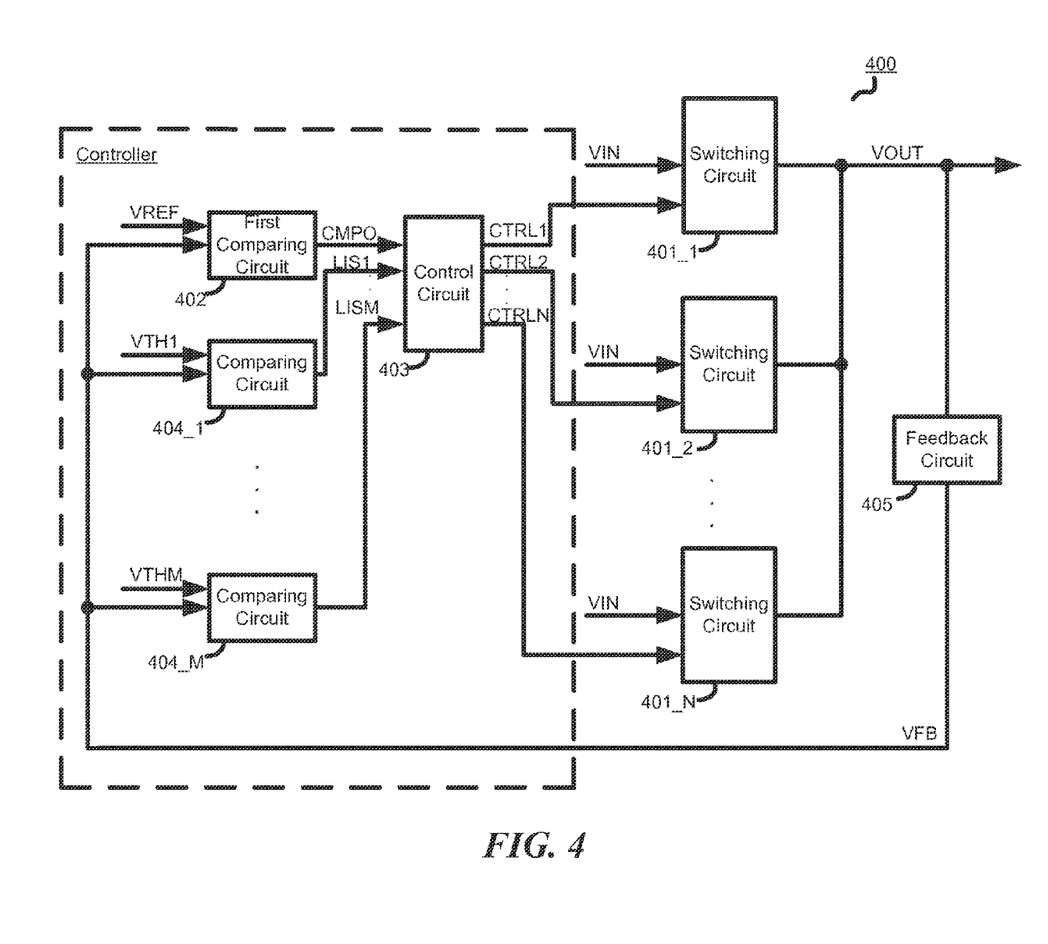
FIG. 4 schematically shows a block diagram of a multi-phase switching converter 400 in accordance with an embodiment of the present invention.

FIG. 4 schematically shows a block diagram of a multi-phase switching converter 400 in accordance with an embodiment of the present invention. Compared with the multi-phase switching converter 100 shown in FIG. 1, the multi-phase switching converter 400 further comprises comparing circuits 404_1~404_M, wherein M is an integer smaller than or equal to N−1. Each comparing circuit 404_$j$ has a first input terminal, a second terminal and an output terminal, wherein j=1, 2, . . . , M. The first input terminal is configured to receive a threshold voltage VTHj, the second input terminal is coupled to the output terminals of the switching circuits to receive the output voltage VOUT. Based on the threshold voltage VTHj and the output voltage VOUT, the comparing circuit 404_$j$ generates a load indication signal LISj at its output terminal. The control circuit 403 is coupled to the output terminals of the comparing circuits 404_1~404_M to receive the load indication signals LIS1~LISM. Based on the load indication signals LIS1~LISM, the control circuit 403 detects whether the load current is increased and determines the number of the switching circuits that have been simultaneously turned on during the overlap mode when a load current increase is detected.

In one embodiment, VREF>VTH1>VTH2> . . . >VTHM and M=N−1. A load increase will be detected if the output voltage VOUT is smaller than VTH1. If the output voltage VOUT is smaller than VTH1 and larger than VTH2, two switching circuits will be turned on simultaneously during the overlap mode. If the output voltage VOUT is smaller than VTH2 and larger than VTH3, three switching circuits will be turned on simultaneously during the overlap mode. Similarly, if the output voltage VOUT is smaller than VTH(N−2) and larger than VTH(N−1), N−1 switching circuits will be turned on simultaneously during the overlap mode. If the output voltage VOUT is smaller than VTH(N−1), all the switching circuits will be turned on simultaneously during the overlap mode.

The switching circuits 401_1~401_N may be configured in any known DC/DC or AC/DC topology, such as BUCK converter, BOOST converter, Flyback converter and so on. The switches in the switching circuits 401_1~401_N may be any controllable semiconductor device, such as MOSFET (metal oxide semiconductor field effect transistor), IGBT (isolated gate bipolar transistor) and so on.

In one embodiment, the multi-phase switching converter 400 further comprises a feedback circuit 405 having an input terminal and an output terminal. The input terminal of the feedback circuit 405 is coupled to the output terminals of the switching circuits 401_1~401_N to receive the output voltage VOUT, the output terminal is coupled to the first comparing circuit 402 and the comparing circuits 404_1~404_M to provide a feedback signal VFB representative of the output voltage VOUT.

In one embodiment, in order to eliminate the sub-harmonic oscillation in the output voltage VOUT, the controller further comprises a slope compensation circuit configured to generate a slope compensation signal. The slope compensation signal may be added to the output voltage VOUT or the feedback signal VFB, or be subtracted from the reference signal VREF and the threshold voltage VTH1~VTHM.

Figure 5:
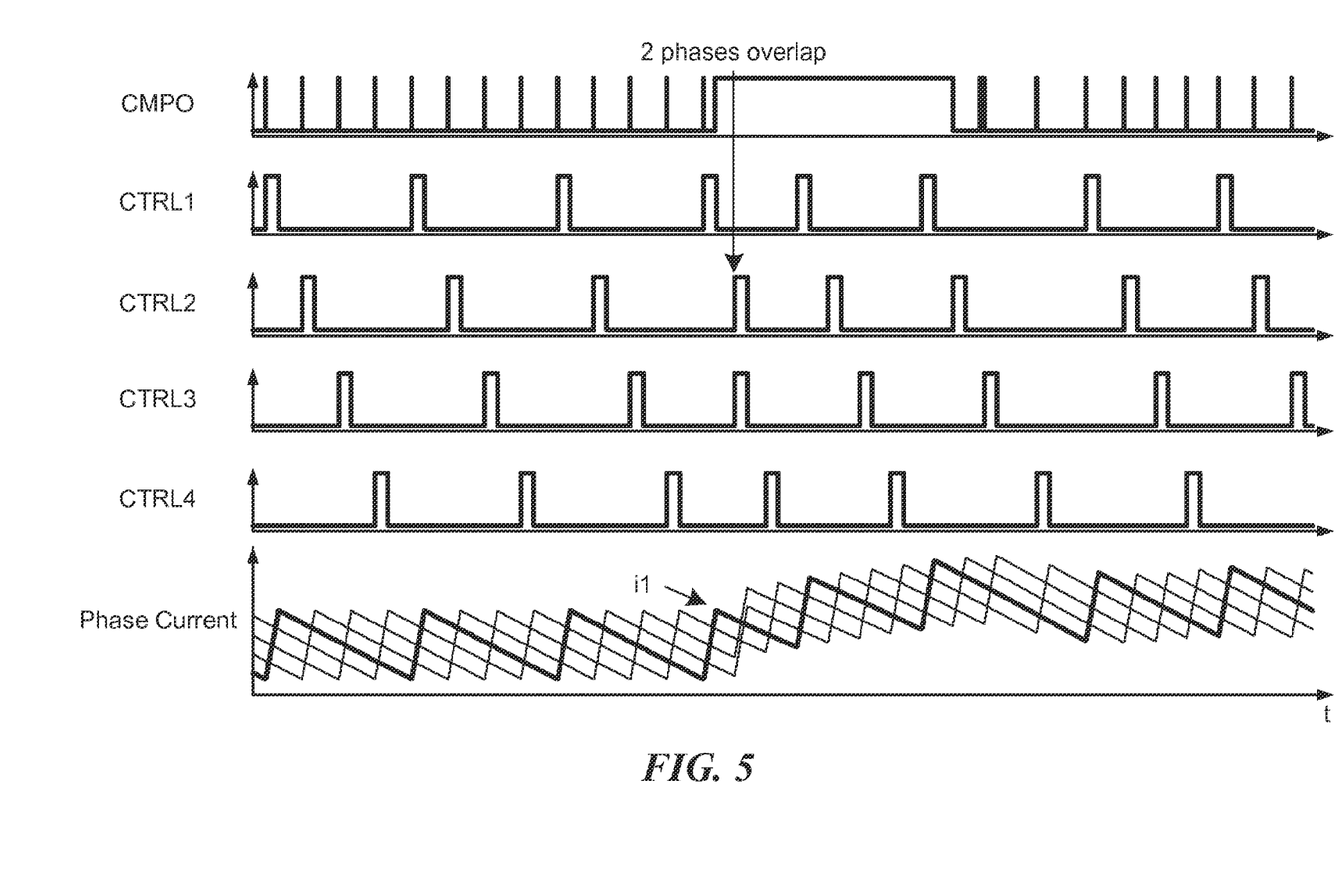
FIG. 5 is a working waveform of a 4-phase switching converter in accordance with one embodiment of the present invention.

FIG. 5 is a working waveform of a 4-phase switching converter in accordance with one embodiment of the present invention. As shown in the figure, after the first switching circuit is turned on, a load current increase is detected and the 4-phase switching converter enters into the overlap mode. Since the output voltage VOUT is smaller than VTH1 and larger than VTH2, the second and third switching circuits are turned on simultaneously. After the overlap mode is finished, the 4-phase switching converter turns on the switching circuits successively from the fourth switching circuit subsequent to the second and third switching circuits. As shown in FIG. 5, the phase current i1 of the first switching circuit is the highest before the overlap happens. However, the phase current i1 does not keep increasing in and after the overlap mode, so the phase current balance is maintained.

Figure 6:
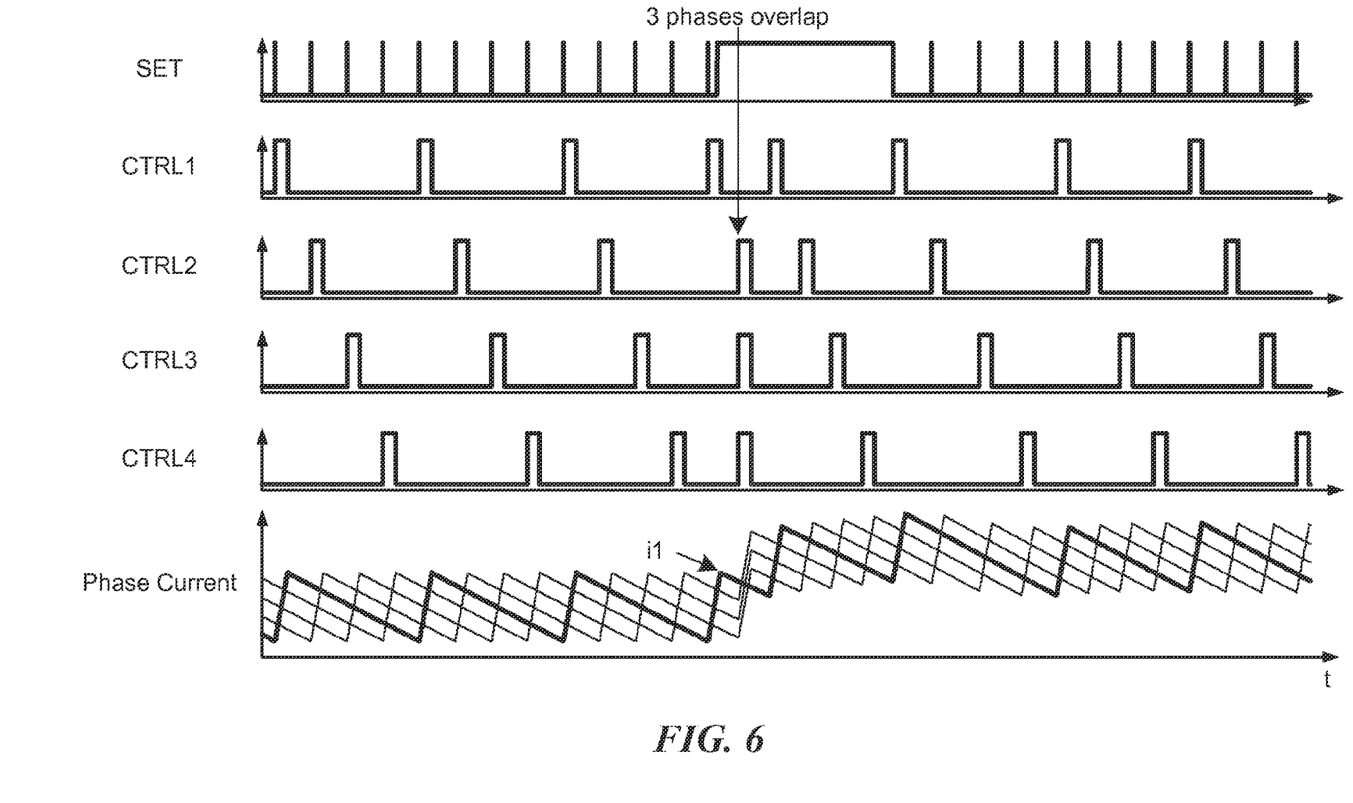
FIG. 6 is a working waveform of a 4-phase switching converter in accordance with another embodiment of the present invention.

FIG. 6 is a working waveform of a 4-phase switching converter in accordance with another embodiment of the present invention. As shown in the figure, after the first switching circuit is turned on, a load current increase is detected and the 4-phase switching converter enters into the overlap mode. Since the output voltage VOUT is smaller than VTH2 and larger than VTH3, the second, third and fourth switching circuits are turned on simultaneously. After the overlap mode is finished, the 4-phase switching converter turns on the switching circuits successively from the first switching circuit subsequent to the second, third and fourth switching circuits. As shown in FIG. 6, the phase current i1 of the first switching circuit is the highest before the overlap happens. However, the phase current i1 does not keep increasing in and after the overlap mode, so the phase current balance is maintained.

Figure 7:
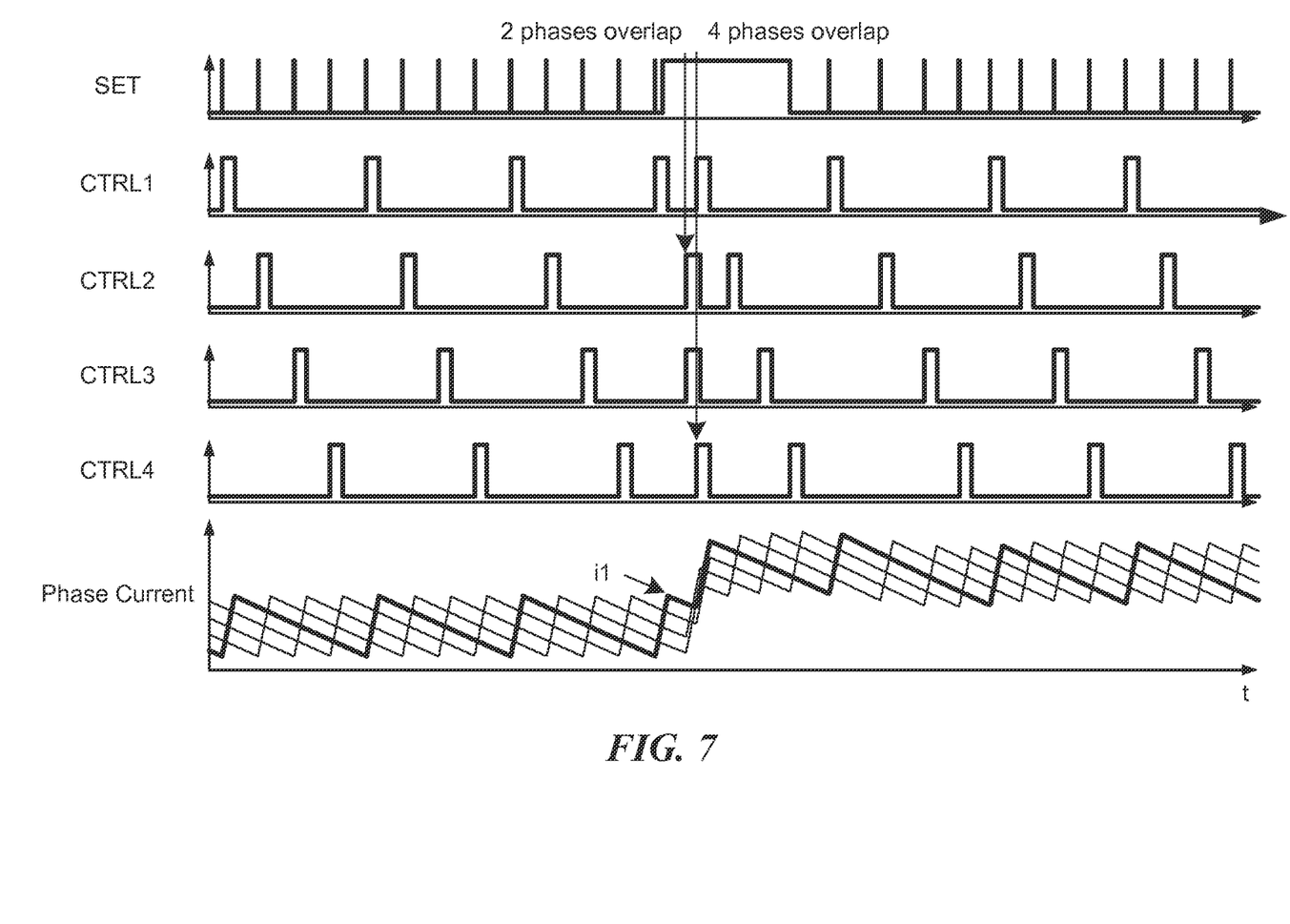
FIG. 7 is a working waveform of a 4-phase switching converter in accordance with still another embodiment of the present invention.

FIG. 7 is a working waveform of a 4-phase switching converter in accordance with still another embodiment of the present invention. As shown in the figure, after the first switching circuit is turned on, a load current increase is detected and the 4-phase switching converter enters into the overlap mode. Since the output voltage VOUT is smaller than VTH1 and larger than VTH2, the second and third switching circuits are turned on simultaneously. During the overlap mode, the output voltage VOUT is decreased to be smaller than VTH3, so the fourth and first switching circuits are turned on simultaneously. After the overlap mode is finished, the 4-phase switching converter turns on the switching circuits successively from the second switching circuit subsequent to the second, third, fourth and first switching circuits. As shown in FIG. 7, the phase current i1 of the first switching circuit is the highest before the overlap happens. However, the phase current i1 does not keep increasing in and after the overlap mode, so the phase current balance is maintained.

Figure 8:
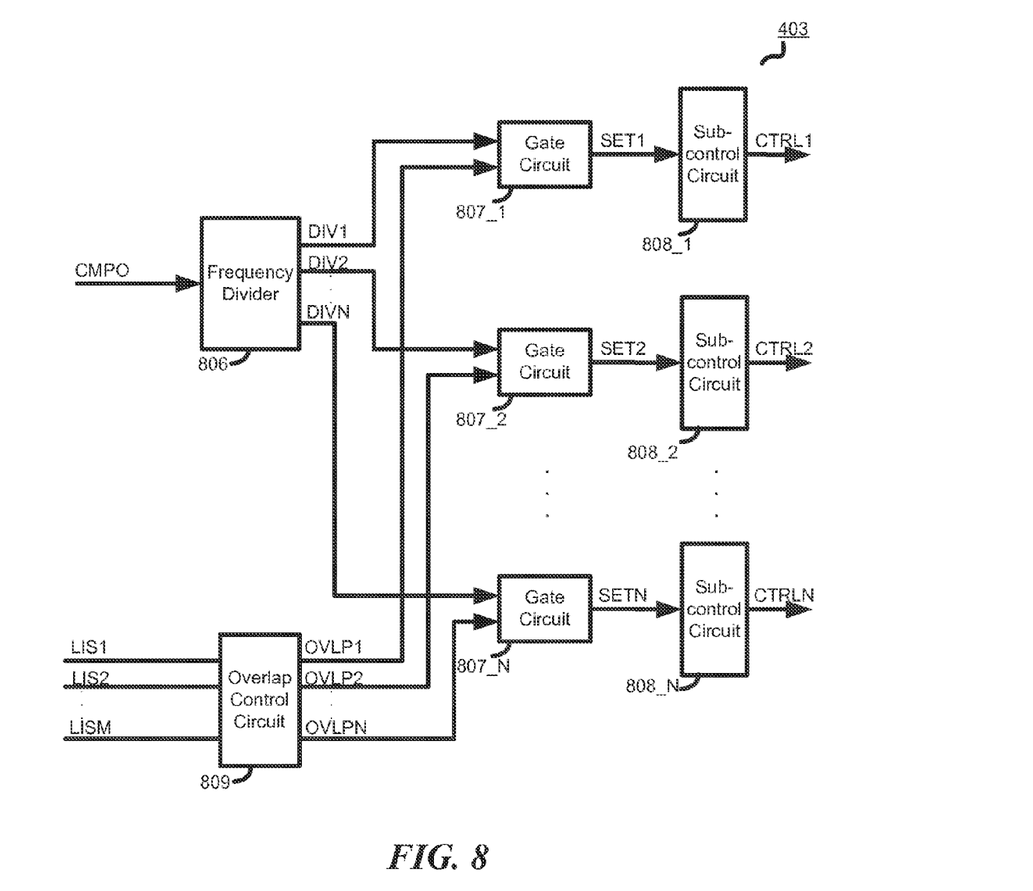
FIG. 8 schematically illustrates the control circuit 403 shown in FIG. 4 in accordance with one embodiment of the present invention.

FIG. 8 schematically illustrates the control circuit 403 shown in FIG. 4 in accordance with one embodiment of the present invention. The control circuit 403 comprises a frequency divider 806, gate circuits 807_1~807_N, sub-control circuits 808_1~808_N and an overlap control circuit 809. The overlap control circuit 809 has M input terminals and N output terminals, wherein the input terminals are configured to receive the load indication signals LIS1~LISM respectively. The overlap control circuit 809 generates overlap signals OVLP1~OVLPN at the output terminals based on the load indication signals LIS1~LISM. The frequency divider 806 has an input terminal and N output terminals, wherein the input terminal is configured to receive the comparison signal CMPO. Based on the comparison signal CMPO, the frequency divider 806 generates frequency dividing signals DIV1~DIVN at the output terminals. Each gate circuit 807_i (i=1, 2, . . . , N) has a first input terminal, a second input terminal and an output terminal, wherein the first input terminal is coupled to the corresponding output terminal of the frequency divider 806 to receive the frequency dividing signal DIVi, the second input terminal is coupled to the corresponding output terminal of the overlap control circuit 809 to receive the overlap signal OVLPi. The gate circuit 807_i generates a set signal SETi at its output terminal based on the frequency dividing signal DIVi and the overlap signal OVLPi. Each sub-control circuit 808_i has an input terminal and an output terminal, wherein the input terminal is coupled to the output terminal of the gate circuit 807_i to receive the set signal SETi, the output terminal is coupled to the corresponding switching circuit to provide the control signal CTRLi. In one embodiment, the gate circuits 807_1~807_N are all OR gates. The overlap control circuit 809 turns on the switching circuits simultaneously through setting the corresponding overlap signals to be logical high.

Figure 9:
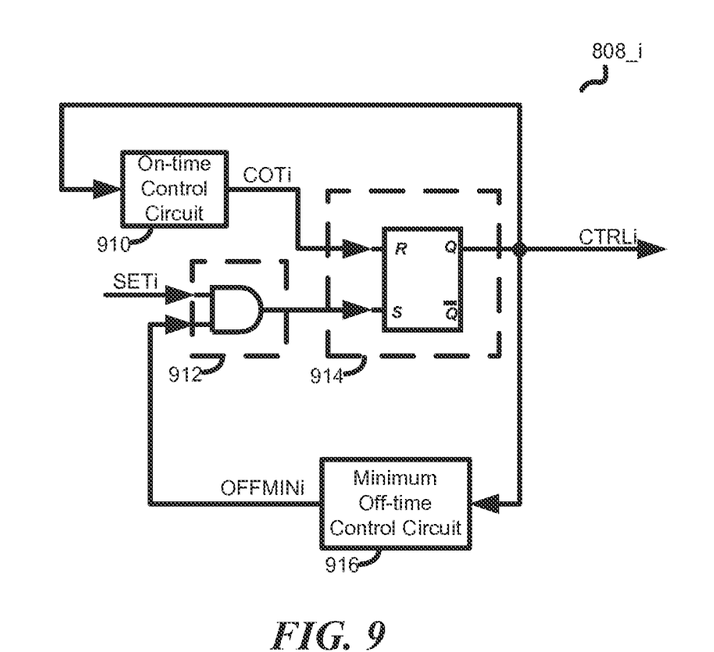
FIG. 9 schematically illustrates a sub-control circuit shown in FIG. 8 in accordance with one embodiment of the present invention.

FIG. 9 schematically illustrates a sub-control circuit shown in FIG. 8 in accordance with one embodiment of the present invention. The sub-control circuit 808_i comprises an on-time control circuit 910, a gate circuit 912, a logic circuit 914 and a minimum off-time control circuit 916. The on-time control circuit 910 is configured to generate an on-time control signal COTi to control the on-time of the switching circuit. The on-time of the switching circuit may be set to a constant value, or a variable value related to the input voltage VIN and/or the output voltage VOUT. The minimum off-time control circuit 916 is configured to generate a minimum off-time control signal OFFMINi to control the minimum off-time of the switching circuit. The gate circuit 912 receives the set signal SETi and the minimum off-time control signal OFFMINi, and generates a logical output signal based on these two signals. The logic circuit 914 is coupled to the on-time control circuit 910 and the gate circuit 912 to receive the on-time control signal COTi and the logical output signal. Based on the on-time control signal COTi and the logical output signal, the logic circuit 914 generates the control signal CTRLi. In one embodiment, the gate circuit 912 is an AND gate and the logic circuit 914 is a RS flip-flop.

Figure 10:
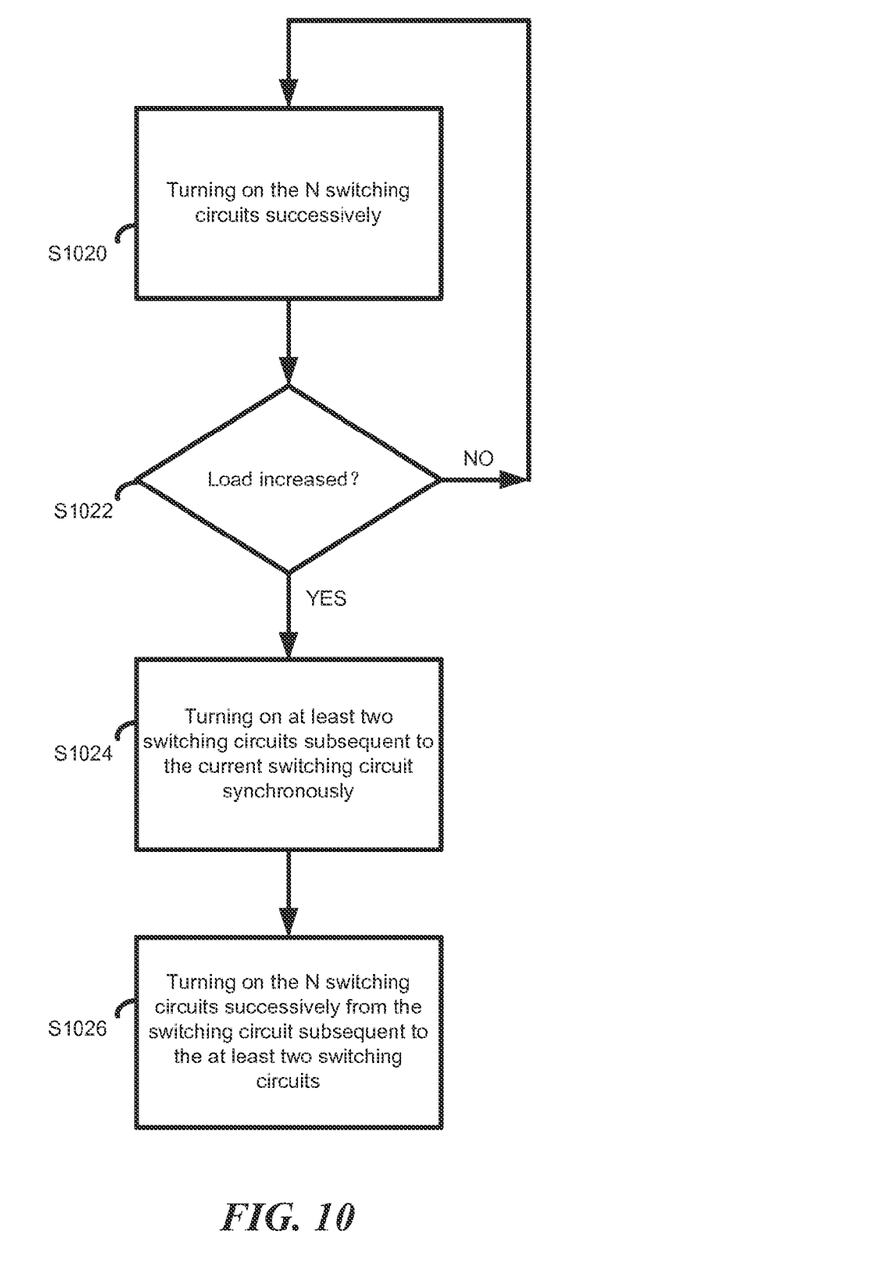
FIG. 10 is a flow chart of a control method used in a multi-phase switching converter, in accordance with an embodiment of the present invention.

FIG. 10 is a flow chart of a control method used in a multi-phase switching converter, in accordance with an embodiment of the present invention. The multi-phase switching converter comprises N switching circuits and the output terminals of the N switching circuits are coupled together to provide an output voltage to a load. The control method comprises steps S1020~S1026.

At step S1020, the multi-phase switching converter operates in an interleave mode and turns on the N switching circuits successively.

At step S1022, whether the load current is increased is detected. If yes, go to step S1024, else, return to step S1020.

At step S1024, the multi-phase switching converter enters into an overlap mode and turns on at least two switching circuits subsequent to the current switching circuit simultaneously.

After the overlap mode is finished, the multi-phase switching converter resumes to the interleave mode at step S1026. The N switching circuits are turned on successively from the switching circuit subsequent to the at least two switching circuits.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

We claim:

1. A controller used in a multi-phase switching converter, wherein the multi-phase switching converter comprises a plurality of switching circuits with each of the switching circuits having an output terminal, the output terminals of the plurality of switching circuits are coupled together to provide an output voltage to a load, the controller is configured to generate a plurality of control signals to turn on the plurality of switching circuits successively, wherein
when a load current increase is detected, the controller operates in an overlap mode and after a current switching circuit of the plurality of switching circuits turns on, at least two switching circuits are turned on simultaneously, and wherein after the controller exits out of the overlap mode, the controller resumes to successively turning on the plurality of switching circuits; and
wherein the controller compares the output voltage with a plurality of threshold voltages to generate a plurality of load indication signals, and wherein based on the plurality of load indication signals, the controller detects whether the load current is increased and determines the number of the switching circuits to simultaneously turn on in the overlap mode.

2. The controller of claim 1, comprising:
a first comparing circuit coupled to the output terminals of the plurality of switching circuits, wherein based on a reference signal and the output voltage, the comparing circuit generates a comparison signal; and
a control circuit coupled to the comparing circuit to receive the comparison signal, wherein based on the comparison signal, the control circuit generates the plurality of control signals.

3. The controller of claim 2, further comprising:
a plurality of comparing circuits, wherein each comparing circuit has a first input terminal, a second input terminal and an output terminal, wherein the first input terminal is configured to receive a threshold voltage, the second input terminal is coupled to the output terminal of the plurality of switching circuits to receive the output voltage, and wherein based on the threshold voltage and the output voltage, the comparing circuit generates a load indication signal at the output terminal.

4. The controller of claim 3, wherein the control circuit comprises:
an overlap control circuit having a plurality of input terminals and a plurality of output terminals, wherein the plurality of input terminals are coupled to the output terminals of the plurality of comparing circuits respectively to receive the plurality of load indication signals, and wherein based on the plurality of load indication signals, the overlap control circuit generates a plurality of overlap signals at the plurality of output terminals;
a frequency divider having an input terminal and a plurality of output terminals, wherein the input terminal is coupled to the first comparing circuit to receive the comparison signal, and wherein based on the comparison signal, the frequency divider generates a plurality of frequency dividing signals at the plurality of output terminals;
a plurality of gate circuits, wherein each gate circuit has a first input terminal, a second input terminal and an output terminal, wherein the first input terminal is coupled to the corresponding output terminal of the frequency divider to receive the frequency dividing signal, the second input terminal is coupled to the corresponding output terminal of the overlap control circuit to receive the overlap signal, and wherein based on the frequency dividing signal and the overlap signal, the gate circuit generates a set signal at the output terminal; and
a plurality of sub-control circuits, wherein each sub-control circuit has an input terminal and an output terminal, and wherein the input terminal is coupled to the output terminal of the corresponding gate circuit to receive the set signal, the output terminal is coupled to the corresponding switching circuit to provide the control signal.

5. The controller of claim 2, further comprising a slope compensation circuit configured to generate a slope compensation signal, wherein the slope compensation signal is added to a feedback signal representative of the output voltage.

6. A multi-phase switching converter, comprising:
a plurality of switching circuits, wherein the output terminals of the plurality of switching circuits are coupled together to provide an output voltage to a load; and
a controller configured to generate a plurality of control signals to turn on the plurality of switching circuits successively; wherein
when a load current increase is detected, the controller operates in an overlap mode and after a current switching circuit of the plurality of switching circuits turns on, at least two switching circuits are turned on simultaneously, and wherein after the controller exits out of the overlap mode, the controller resumes to successively turning on the plurality of switching circuits; and
wherein the controller compares the output voltage with a plurality of threshold voltages to generate a plurality of load indication signals, and wherein based on the plurality of load indication signals, the controller detects whether the load current is increased and determines the number of the switching circuits to simultaneously turn on in the overlap mode.

7. The multi-phase switching converter of claim 6, wherein the controller comprises:
a first comparing circuit coupled to the output terminals of the plurality of switching circuits, wherein based on a reference signal and the output voltage, the comparing circuit generates a comparison signal; and
a control circuit coupled to the comparing circuit to receive the comparison signal, wherein based on the comparison signal, the control circuit generates the plurality of control signals.

8. The multi-phase switching converter of claim 7 wherein the controller further comprises:
a plurality of comparing circuits, wherein each comparing circuit has a first input terminal, a second input terminal and an output terminal, wherein the first input terminal is configured to receive a threshold voltage, the second input terminal is coupled to the output terminal of the plurality of switching circuits to receive the output voltage, and wherein based on the threshold voltage and the output voltage, the comparing circuit generates a load indication signal at the output terminal;
wherein the control circuit comprises:
an overlap control circuit having a plurality of input terminals and a plurality of output terminals, wherein the plurality of input terminals are coupled to the output terminals of the plurality of comparing circuits respectively to receive the plurality of load indication signals, and wherein based on the plurality of load indication signals, the overlap control circuit generates a plurality of overlap signals at the plurality of output terminals;
a frequency divider having an input terminal and a plurality of output terminals, wherein the input terminal is coupled to the first comparing circuit to receive the comparison signal, and wherein based on the comparison signal, the frequency divider generates a plurality of frequency dividing signals at the plurality of output terminals;
a plurality of gate circuits, wherein each gate circuit has a first input terminal, a second input terminal and an output terminal, wherein the first input terminal is coupled to the corresponding output terminal of the frequency divider to receive the frequency dividing signal, the second input terminal is coupled to the corresponding output terminal of the overlap control circuit to receive the overlap signal, and wherein based on the frequency dividing signal and the overlap signal, the gate circuit generates a set signal at the output terminal; and a plurality of sub-control circuits, wherein each sub-control circuit has an input terminal and an output terminal, and wherein the input terminal is coupled to the output terminal of the corresponding gate circuit to receive the set signal, the output terminal is coupled to the corresponding switching circuit to provide the control signal.

9. The multi-phase switching converter of claim 7, wherein the controller further comprises a slope compensation circuit configured to generate a slope compensation signal, wherein the slope compensation signal is subtracted from the reference signal.

10. A control method used in a multi-phase switching converter, wherein the multi-phase switching converter comprises a plurality of switching circuits, the output terminals of the plurality of switching circuits are coupled together to provide an output voltage to a load, the control method comprises:

turning on the plurality of switching circuits successively;

comparing the output voltage with a plurality of threshold voltages to generate a plurality of load indication signals;

detecting whether a load current is increased based on the plurality of load indication signals;

operating in an overlap mode and turning on at least two of the switching circuits simultaneously when a load current increase is detected, wherein the number of the switching circuits to be simultaneously turned on is determined based on the plurality of load indication signals; and resuming the turning on of the plurality of switching circuits successively after exiting out of the overlap mode.

11. The control method of claim 10, wherein the step of turning on the plurality of switching circuits successively comprises:

generating a comparison signal based on a reference signal and the output voltage; and generating a plurality of control signals to control the ON and OFF switching of the plurality of switching circuits.

* * * * *